(12) United States Patent
Ramasubramanian et al.

(10) Patent No.: US 7,583,764 B2
(45) Date of Patent: Sep. 1, 2009

(54) VERSATILE SYSTEM FOR INTERFERENCE TOLERANT PACKET DETECTION IN WIRELESS COMMUNICATION SYSTEMS

(75) Inventors: Karthik Ramasubramanian, Karnataka (IN); Sthanunathan Ramakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 368 days.

(21) Appl. No.: 11/420,619

(22) Filed: May 26, 2006

(65) Prior Publication Data

US 2007/0274205 A1   Nov. 29, 2007

(51) Int. Cl.
  *H04L 27/14* (2006.01)
(52) U.S. Cl. .................................. 375/343; 375/260
(58) Field of Classification Search ............... 375/142, 375/144, 148, 150, 343, 346, 348, 349
  See application file for complete search history.

(56) References Cited

U.S. PATENT DOCUMENTS 7,149,266 B1 * 12/2006 Imamura et al. ............ 375/355
2004/0170197 A1 * 9/2004 Mehta ........................ 370/504
2005/0152317 A1 * 7/2005 Awater et al. ............... 370/338
2006/0002485 A1 * 1/2006 Moher ........................ 375/260
2006/0013180 A1 * 1/2006 Gupta et al. ................ 370/338
2008/0159123 A1 * 7/2008 Tehrani et al. .............. 370/208

* cited by examiner

*Primary Examiner*—Shuwang Liu
*Assistant Examiner*—David Huang
(74) *Attorney, Agent, or Firm*—Steven A. Shaw; W. James Brady; Frederick J. Telecky, Jr.

(57) ABSTRACT

The present invention provides a system for obviating interference effects in packet detection within a wireless communications network. A plurality of reference signals is provided—a first of which corresponds to desired packets, and the remainder of which correspond to undesired packets or interference. A plurality of cross-correlation constructs corresponds, respectively, to the plurality of reference signals. Each cross-correlation construct correlates an incoming signal to a plurality of repetitions of its respective reference signal. An analysis construct compares output from each cross-correlation construct with other cross-correlation construct outputs, and with a threshold value, to determine which incoming signal corresponds to desired packet data. Once this incoming signal is identified, packets from the signal may be reliably received.

14 Claims, 1 Drawing Sheet

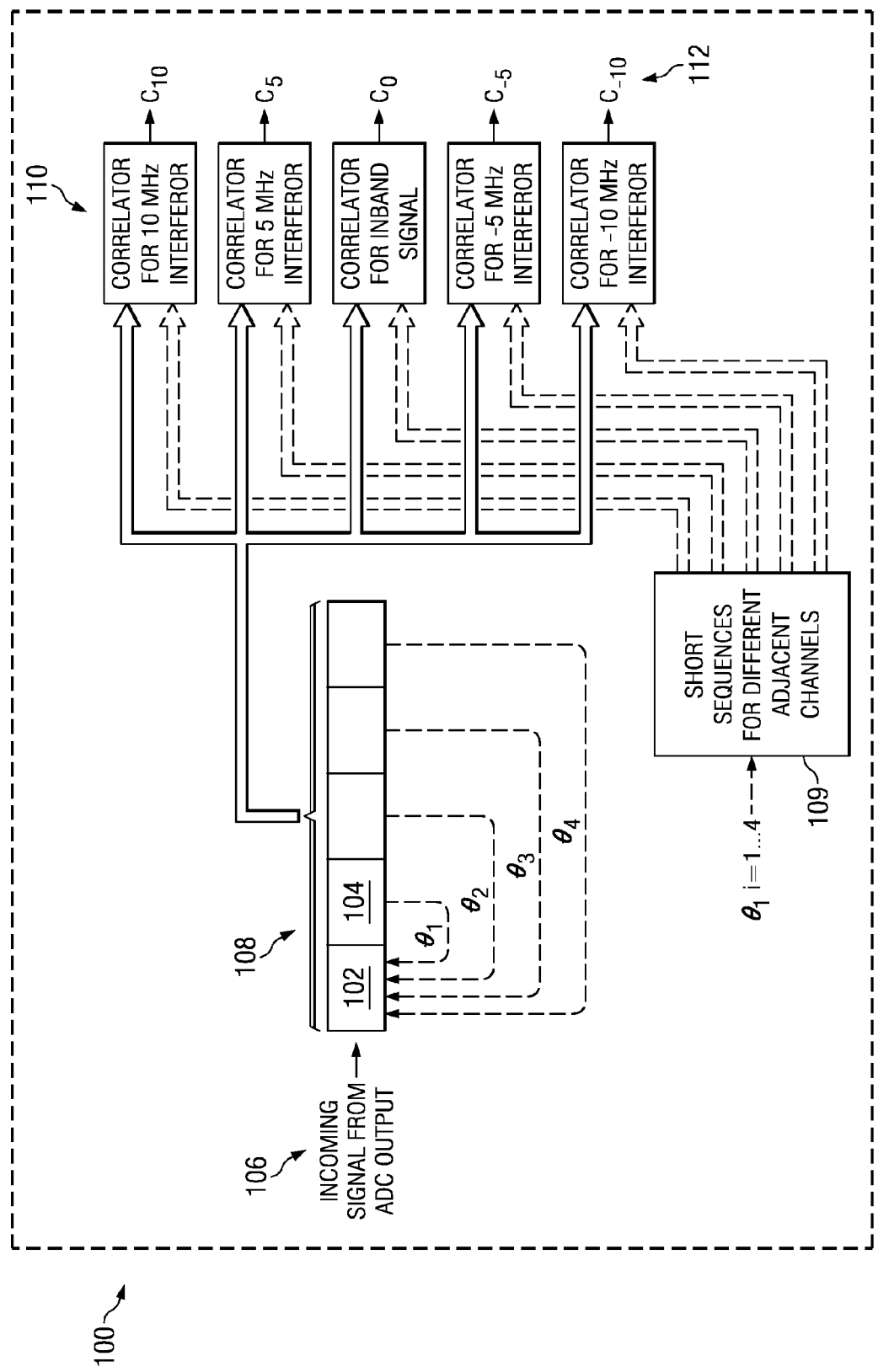

VERSATILE SYSTEM FOR INTERFERENCE TOLERANT PACKET DETECTION IN WIRELESS COMMUNICATION SYSTEMS

TECHNICAL FIELD OF THE INVENTION

The present invention relates generally to the field of wireless communication technologies and, more particularly, to a versatile system for optimizing interference tolerance of packet detection operations in close or overlapping band applications.

BACKGROUND OF THE INVENTION

Increasing demand for more powerful and convenient data and information communication has spawned a number of advancements in communications technologies, particularly in wireless communication technologies. A number of technologies have been developed to provide the convenience of wireless communication in a variety of applications, in various locations. This proliferation of wireless communication has given rise to a number of manufacturing and operational considerations.

A number of existing and emerging wireless communications technologies utilize a modulation scheme, known as Orthogonal Frequency Division Modulation (OFDM), to organize or allocate data transmissions across wide transmission bandwidths. Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.). OFDM extends the FDM scheme to a spread spectrum technique that distributes data over a large number of carriers that are spaced apart at precise frequencies. This spacing provides the "orthogonality"—which prevents demodulators from seeing frequencies other than their own. OFDM systems generally offer good spectral efficiency, resiliency to RF interference, and lower multi-path distortion. OFDM schemes are utilized in a number of common wideband and narrow-bandwidth communications systems and protocols—such as wireless LAN (WLAN) technologies based upon standards such as IEEE 802.11(a) & (g).

Within systems utilizing such protocols and technologies, a number of issues can arise in the detection of arriving packets, as well as from false triggers due to undesired packets or interference. For example, the 802.11(g) spectrum has 20 MHz wide channels, separated from one another by 5 MHz. In a number of applications, the presence of adjacent, potentially interfering channels at 5, 10, 15, and 20 MHz, etc., occurs often and must be addressed. As competing technologies and user deployments increase, such a problem is bound to become more acute.

Commonly, packet detection algorithms for OFDM WLAN packets exploit the fact that a short sequences part of a transmission preamble is periodic with period 0.8 µs—often establishing some type of elaborate timing sequence or scheme. Such approaches have some effectiveness, even in the presence of heavy multipath transmissions. Nonetheless, they are susceptible to frequent failures—particularly where they fail to discriminate between an inband signal (corresponding to a receiver's chosen channel) and a signal from an "overlapping" adjacent channel, since in both cases the short sequences are periodic with a period of 0.8 µs. Also, since the adjacent channel and inband channel signals overlap in frequency, mere filtering cannot alleviate the problem of false triggering on adjacent channel packets.

This false triggering (or detection) phenomenon gives rise to a number of systems performance or reliability problems. One such problem concerns an inability to detect inband packets. There may be instances where an initial false trigger on an adjacent channel packet causes the loss of any inband signal that may come in when this adjacent channel packet is being processed. This leads to a loss of data throughput. Other considerations involve throughput losses due to an inability to transmit. Where false triggers occur on adjacent channels too often, transmission could be blocked when needed—reducing throughput. Furthermore, if a false trigger occurs (on an adjacent channel) at the end of a packet, a CCA (clear channel assessment)—a signal that indicates to a media access controller (MAC) whether a channel is clear to transmit or not—may be lowered, preventing a MAC from transmitting an acknowledgment signal (ACK).

As a result, there is a need for a system that detects packet arrival of packets while, to the greatest extent possible, avoiding interference in a given wireless band—one that obviates performance irregularities by avoiding false triggers due to undesired packets or interference—while providing reliable wireless communication and data transfer in an easy, efficient and cost-effective manner.

SUMMARY OF THE INVENTION

The present invention provides a versatile system, comprising various apparatus and methods, for optimizing interference tolerance of packet detection operations in close or overlapping band applications. The system of the present invention reliably detects the arrival of packets, while avoiding interference in a wireless transmission deployment. The system of the present invention obviates false trigger events due to undesired packets (i.e., those that occupy channels different from a channel selected by a receiver) or interference. The system of the present invention gathers or compiles vital information regarding the amount of interference present in different adjacent channels. The present invention may then evaluate and exploit this information to avoid channels with heavy interference—since such channels offer reduced throughput. The present invention thus more reliably detects desired packets, and rejects undesired packets, while providing improved throughput by avoiding interference-ridden channels.

The system of the present invention cross-correlates a received signal with a bank of reference signals. One of the reference signals corresponds to desired packets, and others correspond to undesired packets and/or interference. Rejection of interference or undesired packets may be provided by comparing cross-correlation outputs—with each other and against a threshold value. This process of rejecting undesired interference packets provides an estimate of interference in adjacent channels. Furthermore, the system of the present invention provides effective cross-correlation even in the presence of frequency offset.

Specifically, the present invention provides a system that reduces or eliminates interference effects in packet detection within a wireless communications network. A plurality of reference signals is provided—a first of which corresponds to desired packet data, and the remainder of which correspond to undesired packet data or signal interference. A plurality of cross-correlation constructs corresponds, respectively, to the plurality of reference signals. Each cross-correlation construct correlates an incoming signal to a plurality of repetitions of its respective reference signal. An analysis construct then compares output from each cross-correlation construct with other cross-correlation construct outputs, and with a threshold value, to determine whether the incoming signal corresponds to and contains desired packet data. Once this is identified, packets from the signal may be reliably received.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 1 provides an illustration depicting one embodiment of a system implementing a correlation construct in accordance with certain aspects of the present invention.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The present invention is hereafter illustratively described primarily in conjunction with certain design and operation considerations of certain WLAN systems. Certain aspects of the present invention are further detailed in relation to design and operation considerations of systems utilizing IEEE 802.11(a) or (g) protocols. Although described in relation to such constructs and technologies, the teachings and embodiments of the present invention may be beneficially implemented with a variety of wireless communications systems or applications. The specific embodiments discussed herein are, therefore, merely demonstrative of specific ways to make and use the invention and do not limit the scope of the invention.

The present invention provides a versatile system, comprising various apparatus and methods, for optimizing interference tolerance of packet detection operations in close or overlapping band applications. The system of the present invention reliably detects the arrival of packets, while avoiding interference in a wireless transmission deployment. The system of the present invention obviates false trigger events due to undesired packets (i.e., those that occupy channels different from a channel selected by a receiver) or interference. The system of the present invention gathers or compiles vital information regarding the amount of interference present in different adjacent channels. The present invention may then evaluate and exploit this information to avoid channels with heavy interference—since such channels offer reduced throughput. The present invention thus more reliably detects desired packets, and rejects undesired packets, while providing improved throughput by avoiding interference-ridden channels.

The system of the present invention cross-correlates a received signal with a bank of reference signals. One of the reference signals corresponds to desired packets, and others correspond to undesired packets and/or interference. The present invention provides an analysis construct, in which rejection of interference or undesired packets may be provided by comparing cross-correlation outputs—with each other and against a threshold value. This process of rejecting undesired interference packets provides an estimate of interference in adjacent channels. Furthermore, the system of the present invention provides effective cross-correlation even in the presence of frequency offset.

As previously noted, even where conventional systems might be provided with a robust packet detection algorithm that detects only in-band packets, various interferences (e.g., frequency overlaps) can nonetheless lead to higher packet errors and reduce network throughput. Nevertheless, the present invention recognizes that—in such a scenario—a protocol, system or method that generates some metrics for making decisions concerning movement to an entirely different channel (i.e., one where there is potentially less interference) may be extremely useful. Such metrics may be used either in an automated fashion, or may be presented to a user or an administrator for making a decision. Such an approach may provide a higher throughput for an access point using such an algorithm, and also for other devices in adjacent channels.

Comprehending this, the present invention provides a communications system that is not only resistant to interference—by obviating adjacent channel triggering—but also provides a capability to avoid interference entirely. The present invention recognizes that in a number of applications, it may be desirable to have an ability to reject adjacent channel packets within a short sequences part of a preamble itself—such that slot-time requirements are met. For example, transmissions can only start at the beginning of a 9 μs "slot" in 802.11(a)/(g). As such, certain embodiments of the present invention pass an incoming signal into a bank of a programmable number of cross-correlators. For example, five such cross-correlators may be provided—one for an inband signal (i.e., 0 MHz offset), and the remaining four for possible "overlapping" adjacent channel interferers (i.e., at 5, −5, 10 and −10 MHz offsets). In each cross-correlator, incoming samples are correlated against several repetitions of a corresponding ideal short sequence. Depending upon design requirements or limitations, various implementations of cross-correlators may be provided in accordance with the present invention. For example, certain embodiments may be provided to keep implementation complexity of cross-correlators low, using only sign bits of an incoming signal as well as reference signals.

In certain circumstances, it might be possible that the effectiveness of a cross-correlator would decrease if some frequency offset exists in a received signal. According to the present invention, however, the performance of the cross-correlators is improved or optimized under frequency offsets by using phase offsets between different 0.8 μs blocks of a received signal, and by using those phase offsets to select appropriate phases of an ideal short sequence to use in cross-correlation. This is illustrated in reference now to FIG. 1, which depicts one illustrative embodiment of a cross-correlation construct 100 in accordance with the present invention. Construct 100 may comprise a single device, a system of devices, some number of software constructs operating on one or more processors, or any suitable configuration or combination of hardware and software. Construct 100 computes a conjugate product of a most-recent 0.8 μs block 102 of received samples with a previous 0.8 μs block 104, to obtain a phase offset value $\theta_1$. Similarly, construct 100 obtains phase offsets $\theta_2, \theta_3 \ldots \theta_N$ from conjugate products of received signal 106 with delayed versions of itself 108. Construct 100 utilizes these phase offsets in selection of phases of ideal short sequence patterns 109 that are used in cross-correlators 110. Thus, in each cross-correlator 110, the ideal (reference) short sequence pattern is selected or provided such that its second repetition will be at a phase offset of $\theta_1$ with respect to the first repetition and similarly, the third repetition will be at a phase offset of $\theta_2$, and so on for N+1 repetitions. This is provided to ensure that—even in the presence of frequency offset—cross-correlation will function effectively.

Depending upon specific system or design requirements or limitations, certain embodiments of the present invention may implement this system through storing several short sequence patterns in a receiver, and select the appropriate ones to use in cross-correlation. In certain embodiments, instead of storing several short sequence patterns, the incoming signal may be derotated by different frequencies corresponding to the different channel center frequencies and correlated with the inband short sequence pattern. In certain embodiments, for example, the short sequence patterns may correspond to different phases. Only phases in the range [0, π2) need to be stored. For higher phases, stored ideal patterns may be reused by appropriate change or alteration of I,Q quadrature samples, or the signs of the samples. In other embodiments, a single pattern may be stored, having phase of—for example—0 degrees. Phase offset may be corrected after cross-correlation of each received 0.8 μs block with it. In some embodiments, it may be desirable to further reduce complexity by quantizing the phases to only 16 phases for full range [0, 2π)—i.e., 4 phases for each quadrant. Furthermore, phase rotations may be implemented using shift-and-adds rather than complex multiplies.

Cross-correlation outputs 112 are provided such that the magnitude of the correct correlator's output is generally greater than that of the others. For example, if the incoming packet is an inband packet, then the magnitude of a 0 MHz cross-correlator output may be provided such that it exceeds a threshold, as well as be greater than that of the other four cross-correlators. This difference may be well pronounced with more repetitions of the short sequence in the cross-correlation, but that would cause a delay in CCA declaration, which might be unacceptable. The number of repetitions used in cross-correlation may be provided as fixed, dynamic or programmable. A good estimate of how many to use may be provided by—for example—considering slot time and receive-transmit mode turnaround time. Slot time is usually on the order of 9 μs, and receive/transmit (rx-tx) turnaround time is typically on the order of 3-4 μs. CCA must be declared by the time about 5-6 periods of the short sequence (each period is 0.8 μs) have been received. Most embodiments should find 5 or 6 repetitions a sufficient or optimum choice for the number of repetitions to use for each cross-correlation.

In order to differentiate inband packets from interference, the system of the present invention divides the output 112 of each cross-correlator 110 into windows of 0.8 μs duration, and finds the peak magnitude of the correlation outputs in every window for all cross-correlators. For example, $C_0(n)$, $C_5(n)$, $C_{-5}(n)$, $C_{10}(n)$ and $C_{-10}(n)$ may be defined as the peaks in the $n^{th}$ window, where n=1, 2, 3, etc., denote the most recent window, the window previous to that, etc.

An inband packet may be considered to be detected if the inband correlation's peak, i.e., $C_0(n)$, exceeds a threshold (CORR_THRESH), and is larger than the peaks of the other correlators, in—for example—at least two of the last three windows. These values and thresholds may be varied or adapted depending upon the requirements or limitations of the application in which the system operates. Evaluation or comparison of the correlation values is provided by an analysis construct, which may also be constructed to generate a packet detect (PD) signal. This functionality may be provided by, for example, the following pseudo-code algorithm:

```
if Time_Elapsed == 0.8 μs, then;
    calculate magnitude peaks C_0(n), C_5(n), C_-5(n), C_10(n)
    and C_-10(n), then;
    if C_0(n) > CORR_THRESH and C_0(n) > max(C_0(n), C_5(n),
    C_-5(n), C_-10(n), C_10(n)), then;
        Result (n) = TRUE;
    else
        Result (n) = FALSE;
    endif;
    if Result (n) == TRUE and (Result (n-1) or Result (n-2) == TRUE),
    then;
        PD = 1;
    else
        PD = 0;
    endif
    reset Time_Elapsed and increment n;
else
    increment Time_Elapsed;
endif.
```

In order to trade-off inband sensitivity versus adjacent channel interference rejection, and render the system singularly or dynamically optimizable, programmable bias values may be provided to the different correlator outputs. For example, if there is a need to improve inband packet detection sensitivity, a positive bias may be added to $C_0$, so that results of comparison are skewed in favor of the inband packets.

The pseudo-code algorithm above may be easily modified to count the number of packets that arrive in each channel. For example, a receiver may maintain five counters for the five different channels, and increment the appropriate counter depending on which cross-correlator output is the highest, as well as exceeds CORR_THRESH. As such, a receiver may track or determine how many packets have been detected in each of the channels. This information about traffic density in the different channels may then be evaluated or processed to—for example—switch to a channel where there is a relatively lower amount of interference. This aspect of the present system may be exploited to improve overall network throughput.

The present invention thus provides a cross-correlation based packet detection system that provides robust, stable and efficient performance in the presence of adjacent channel interference. In addition, the system of the present invention also ascertains information regarding amount of interference occurring in various channels, which may then be processed for selecting a different channel having less interference—improving overall network throughput.

The embodiments and examples set forth herein are therefore presented to best explain the present invention and its practical application, and to thereby enable those skilled in the art to make and utilize the invention. However, those skilled in the art will recognize that the foregoing description and examples have been presented for the purpose of illustration and example only. For example, certain aspects of the present invention have been described above in relation to certain IEEE 802.11(a)/(g) considerations. The teachings and principles of the present invention are equally applicable, however, to a wide range of other IEEE standards, operational protocols, and wireless systems. The description as set forth herein is therefore not intended to be exhaustive or to limit the invention to the precise form disclosed. As stated throughout, many modifications and variations are possible in light of the above teaching without departing from the spirit and scope of the following claims.

What is claimed is:

1. A method of packet detection within a wireless communications network, the method comprising the steps of:
providing a plurality of reference signals, a first of which corresponds to desired packets, and the remainder of which correspond to undesired packets or interference;
providing a plurality of cross-correlation constructs from a number of cross-correlators, said plurality of cross-correlation constructs corresponding, respectively, to the plurality of reference signals, each adapted to correlate an incoming signal to a plurality of repetitions of its respective reference signal, wherein a plurality of subsequent repetitions of the reference signal will be phase offset with an initial repetition of the first reference signal;
providing an analysis construct adapted to compare output from each cross-correlation construct with other outputs from other cross-correlation constructs and with a threshold value;
providing incoming signals to the plurality of cross-correlation constructs;
performing cross-correlation on the incoming signals;
utilizing the analysis construct to determine a desired incoming signal that corresponds to desired packets; and
detecting packets from the desired incoming signal.

2. The method of claim 1, wherein the wireless communications network comprises a wireless local area network LAN system and the said reference signals correspond to short sequence patterns in the wireless local area network systems.

3. The method of claim 2, wherein the wireless communications network comprises an IEEE 802.11(a) protocol.

4. The method of claim 2, wherein the wireless communications network comprises an IEEE 802.11(g) protocol.

5. The method of claim 1, wherein the step of providing a plurality of cross-correlation constructs further comprises providing a cross-correlation construct for an inband signal.

6. The method of claim 1, wherein the step of providing an analysis construct further comprises providing an algorithm that determines peak magnitude of outputs from cross-correlation constructs.

7. The method of claim 1, wherein the step of utilizing the analysis construct further comprises comparing peak magnitude of outputs from cross-correlation constructs with a desired correlation threshold value.

8. The method of claim 1, wherein the step of utilizing the analysis construct further comprises comparing peak magnitude of outputs from cross-correlation constructs with each other to determine if the desired signal has the highest cross-correlation.

9. A method of packet detection within a wireless communications network, the method comprising the steps of:
providing a plurality of reference signals, a first of which corresponds to desired packets, and the remainder of which correspond to undesired packets or interference;
providing a plurality of cross-correlation constructs from a number of cross-correlators, said plurality of cross-correlation constructs corresponding, respectively, to the plurality of reference signals, each adapted to correlate an incoming signal to a plurality of repetitions of its respective reference signal;
providing a cross-correlation construct for each adjacent channel interferer
providing a cross-correlation construct for the each adjacent channel interferer at positive and negative 5 MHz intervals from inband;
providing an analysis construct adapted to compare output from each cross-correlation construct with other outputs from other cross-correlation constructs and with a threshold value;
providing incoming signals to the plurality of cross-correlation constructs;
performing cross-correlation on the incoming signals;
utilizing the analysis construct to determine a desired incoming signal that corresponds to desired packets; and
detecting packets from the desired incoming signal.

10. A system performing packet detection within a wireless local area network, the system comprising:
a plurality of reference signals, a first of which corresponds to desired packets, and the remainder of which correspond to undesired packets or interference;
a plurality of cross-correlation constructs from a number of cross-correlators, said plurality of cross-correlation constructs corresponding, respectively, to the plurality of reference signals, each adapted to correlate an incoming signal to a plurality of repetitions of its respective reference signal, wherein a plurality of subsequent repetitions of the reference signal will be phase offset with an initial repetition of the first reference signal;
an analysis construct adapted to compare output from each cross-correlation construct with other outputs from other cross-correlation constructs and with a threshold value; and
incoming signals provided to the plurality of cross-correlation constructs.

11. The system of claim 10, wherein the wireless local area network comprises an IEEE 802.11(a) protocol.

12. The system of claim 10, wherein the wireless local area network comprises an IEEE 802.11(g) protocol.

13. The system of claim 10, wherein the system comprises a software construct operating on a processor.

14. The system of claim 10, wherein the system comprises an integrated circuit.

* * * * *

UNITED STATES PATENT AND TRADEMARK OFFICE
CERTIFICATE OF CORRECTION

PATENT NO.       : 7,583,764 B2                                      Page 1 of 1
APPLICATION NO.  : 11/420619
DATED            : September 1, 2009
INVENTOR(S)      : Ramasubramanian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Fourteenth Day of September, 2010

David J. Kappos
*Director of the United States Patent and Trademark Office*